No. 871,728. PATENTED NOV. 19, 1907.
A. MOUNEYRAT.
BURNER FOR HEATING AND LIGHTING.
APPLICATION FILED AUG. 28, 1906.
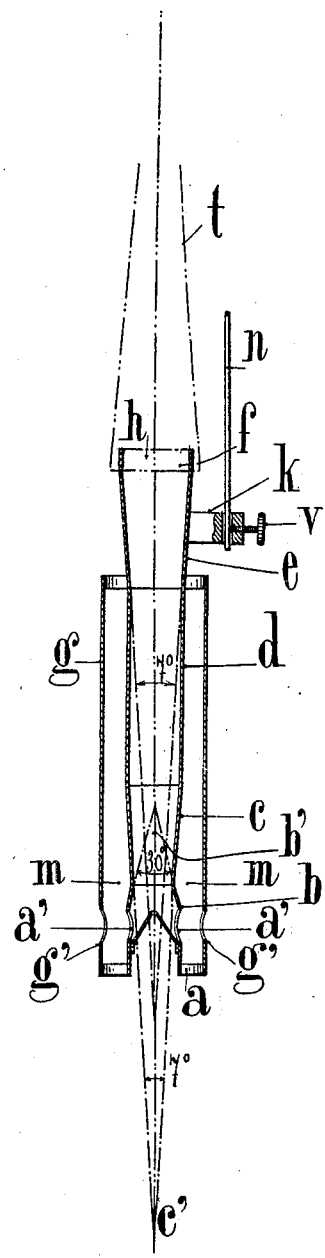
WITNESSES:
W. P. Burke
W. E. Perkins
INVENTOR
Antoine Mouneyrat
BY
ATTORNEYS.

UNITED STATES PATENT OFFICE.

ANTOINE MOUNEYRAT, OF PARIS, FRANCE.

BURNER FOR HEATING AND LIGHTING.

No. 871,728.      Specification of Letters Patent.      Patented Nov. 19, 1907.

Application filed August 28, 1906. Serial No. 332,361.

*To all whom it may concern:*

Be it known that I, ANTOINE MOUNEYRAT, a citizen of the Republic of France, and resident of Paris, France, have invented a new and useful Burner for Heating and Lighting, which burner is fully set forth in the following specification.

This invention relates to a new kind of Bunsen burner, which, for a given consumption of any combustible gas, produces as hot a flame as possible.

As shown in the accompanying drawing which is a sectional view, the burner comprises a cylindrical casing $g$, completely closed at bottom and top, but provided with holes $g^1$ for the admission of air; this casing incloses the pipe or tube for mixing gas and air in the burner. By means of this casing a chamber containing hot air is formed around the mixing chamber constituting an insulating layer between the external air and the burner. This insulating layer prevents the greatest portion of the proper heat of the burner, from being lost by radiation.

The tube constituting the mixing chamber for gas and air, is arranged as follows. A cylindrical portion $a$, provided with air inlet holes $a^1$ surrounds the injector through which gas is admitted. At a level, practically the same as that of the upper portion of the injector, the cylindrical tube $a$ is connected to a truncated cone $b$, the angle of which at the top $b^1$ is about 30°. The small base $m$ $m$ of the truncated cone $b$, situated above the level of the injector, coincides with the small base of a second truncated cone $c$, arranged in the opposite direction and having the angle $c^1$ at the apex equal to about 7°.

Beyond the truncated cone $c$, the mixing chamber is constituted by a cylindrical portion $d$, the diameter of which is about 8 or 9 times the diameter of the injector opening. The cylindrical portion $d$ ends at top in a third truncated cone $e$, the walls of which are practically parallel to those of the truncated cone $c$, so that the angle at the apex is also about 7°. A very short cylindrical portion $f$ terminates the mixing chamber at the top.

This cylindrical portion is provided with a metal netting $h$ which is perfectly horizontal, concave or convex, according to circumstances.

Instead of supporting the mantle $t$ by a gallery carrying the glass chimney, the cone $e$ may be provided with a small rod $k$ provided with a hole in which engages the rod $n$ of the mantle $t$ by means of a screw $v$. The said rod $k$ is about one centimeter from the upper level $h$ of the burner.

Claims.

1. A gas burner comprising an injector, an outer casing having air inlets therein, and an interior casing isolated from the exterior casing, said interior casing consisting of a cylindrical portion surrounding the injector and having air inlet openings therein said cylindrical portion being of approximately the same height as the injector, a short truncated cone connected to the cylindrical portion, a longer inverted truncated cone connected to the first cone, a long cylindrical portion connected to the second cone, and an inverted truncated cone connected to said cylindrical portion.

2. A gas burner comprising an injector, an outer casing having air inlets therein, and an interior casing isolated from the exterior casing, said interior casing consisting of a cylindrical portion surrounding the injector and having air inlet openings therein said cylindrical portion being of approximately the same height as the injector, a short truncated cone connected to the cylindrical portion, a longer inverted truncated cone connected to the first cone, a long cylindrical portion connected to the second cone, an inverted truncated cone connected to said cylindrical portion and a short cylindrical portion connected to the last mentioned cone.

In testimony whereof I have signed this specification in the presence of two subscribing witnesses.

ANTOINE MOUNEYRAT.

Witnesses:
     DANIEL PARKINS,
     GASTON RAGÉ.